United States Patent
Rointru et al.

(10) Patent No.: US 6,422,964 B1
(45) Date of Patent: Jul. 23, 2002

(54) BELT TENSIONER, AND A DRIVE SYSTEM AND ENGINE INCLUDING SUCH A TENSIONER

(75) Inventors: Claude Rointru, Mazieres de Touraine; Patrice Defeings, Ambillou, both of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/489,766

(22) Filed: Jan. 24, 2000

(30) Foreign Application Priority Data

Jan. 25, 1999 (FR) .............................. 99 00778

(51) Int. Cl.⁷ .................................................. F16H 7/12
(52) U.S. Cl. ........................ 474/138; 474/133; 474/135
(58) Field of Search .................................. 474/135, 133, 474/138, 117, 112, 111, 114, 101, 140, 136, 137, 113; 305/146, 152, 143, 154

(56) References Cited

U.S. PATENT DOCUMENTS

| | | |
|---|---|---|
| 4,416,648 A | 11/1983 | Radocaj |
| 4,726,801 A | 2/1988 | Stark |
| 4,743,224 A * | 5/1988 | Yoshikawa et al. ..... 474/133 X |
| 4,765,444 A | 8/1988 | Bauer et al. |
| 5,073,158 A | 12/1991 | Ojima |
| 5,246,404 A * | 9/1993 | Ojima .................. 474/140 X |
| 5,601,505 A | 2/1997 | Tada |
| 5,851,058 A * | 12/1998 | Humbek et al. ............ 305/146 |

FOREIGN PATENT DOCUMENTS

| | | | | |
|---|---|---|---|---|
| DE | 523754 | * | 4/1931 | ......... 474/138 |
| EP | 0210508 A | | 2/1987 | |
| GB | 696586 | * | 9/1953 | ......... 474/138 |
| GB | 724522 | | 2/1955 | |
| IT | 647308 | * | 10/1963 | ......... 474/138 |

* cited by examiner

Primary Examiner—David A. Bucci
Assistant Examiner—Marcus Charles
(74) Attorney, Agent, or Firm—Michael Best & Friedrich LLP

(57) ABSTRACT

A tensioner comprising a rigid cage provided with a fixing means for fixing to an engine block or to a plate rotatably mounted on the engine block. The cage slidably receives a rigid part that carries, preferably at one of its ends, bearing means for bearing against the belt, which bearing means can be constituted by a wheel. Resilient return means are mounted inside the wheel-supporting part to urge the cage and the part towards a spaced-apart position, the return means being constituted preferably by a helical spring.

14 Claims, 5 Drawing Sheets

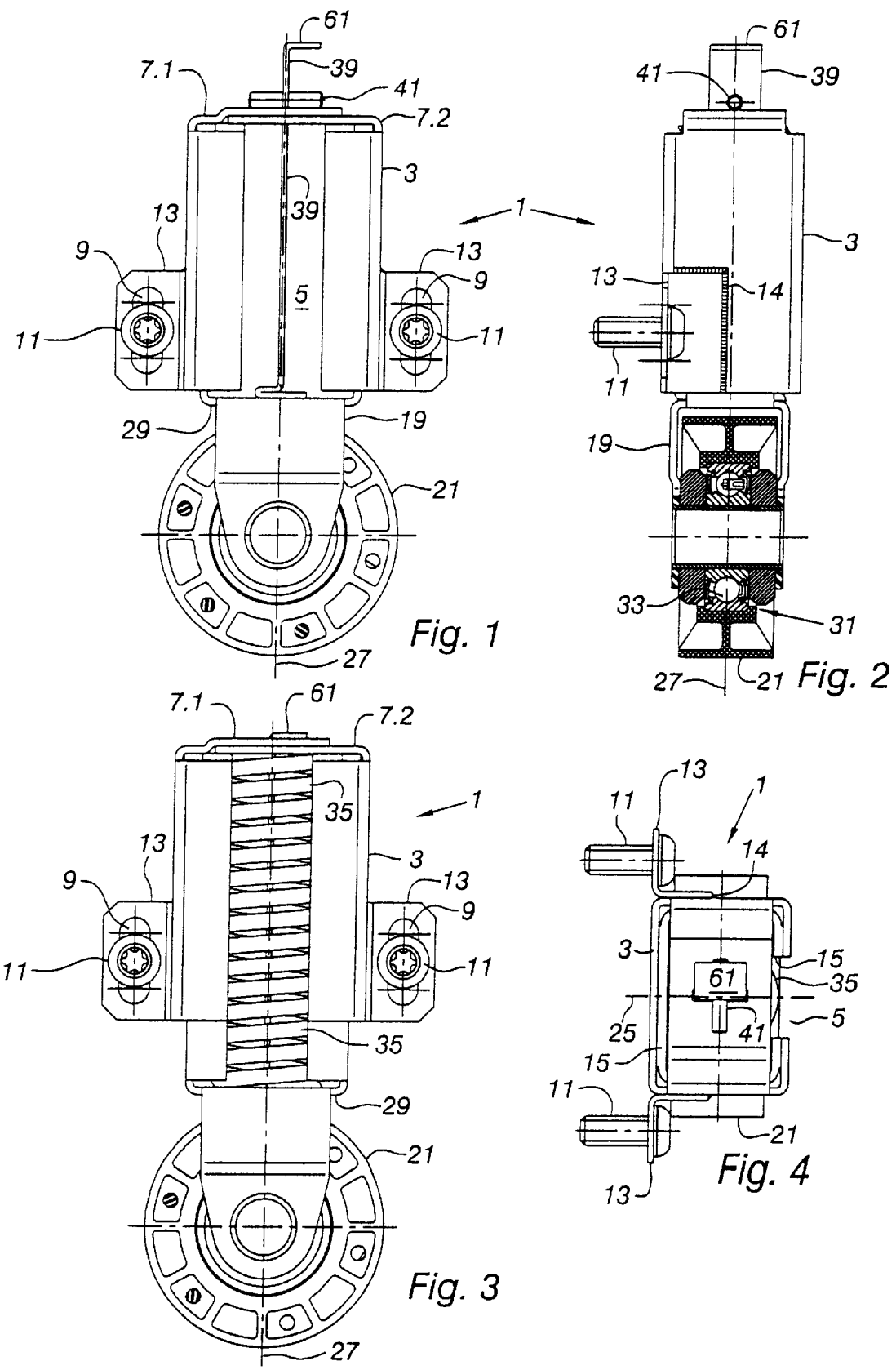

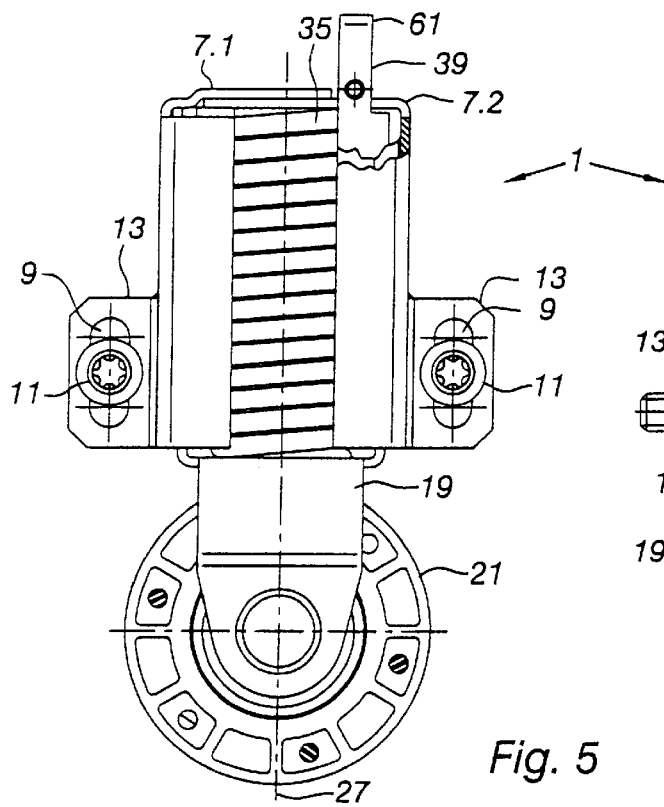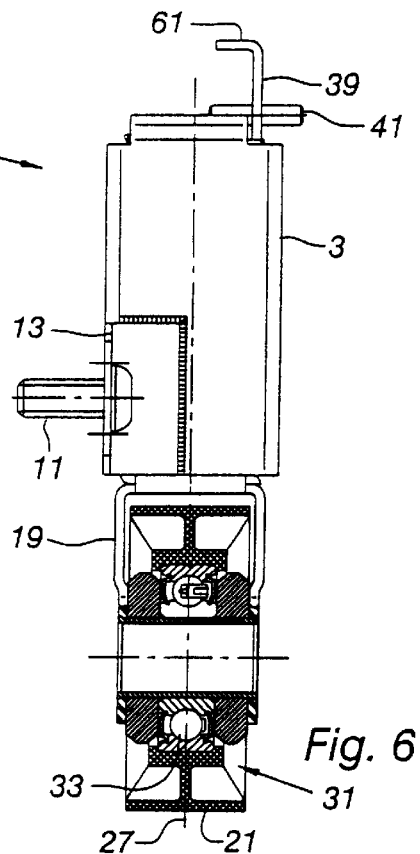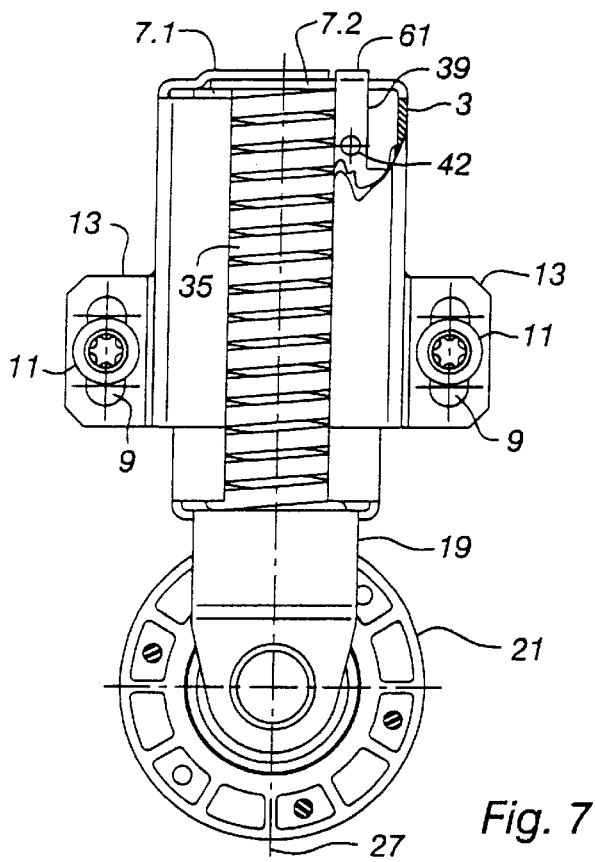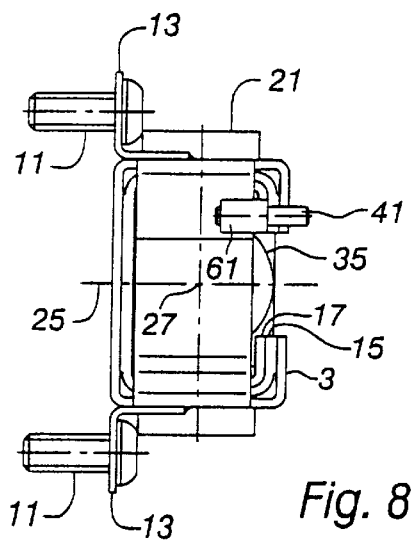
Fig. 5
Fig. 6
Fig. 7
Fig. 8

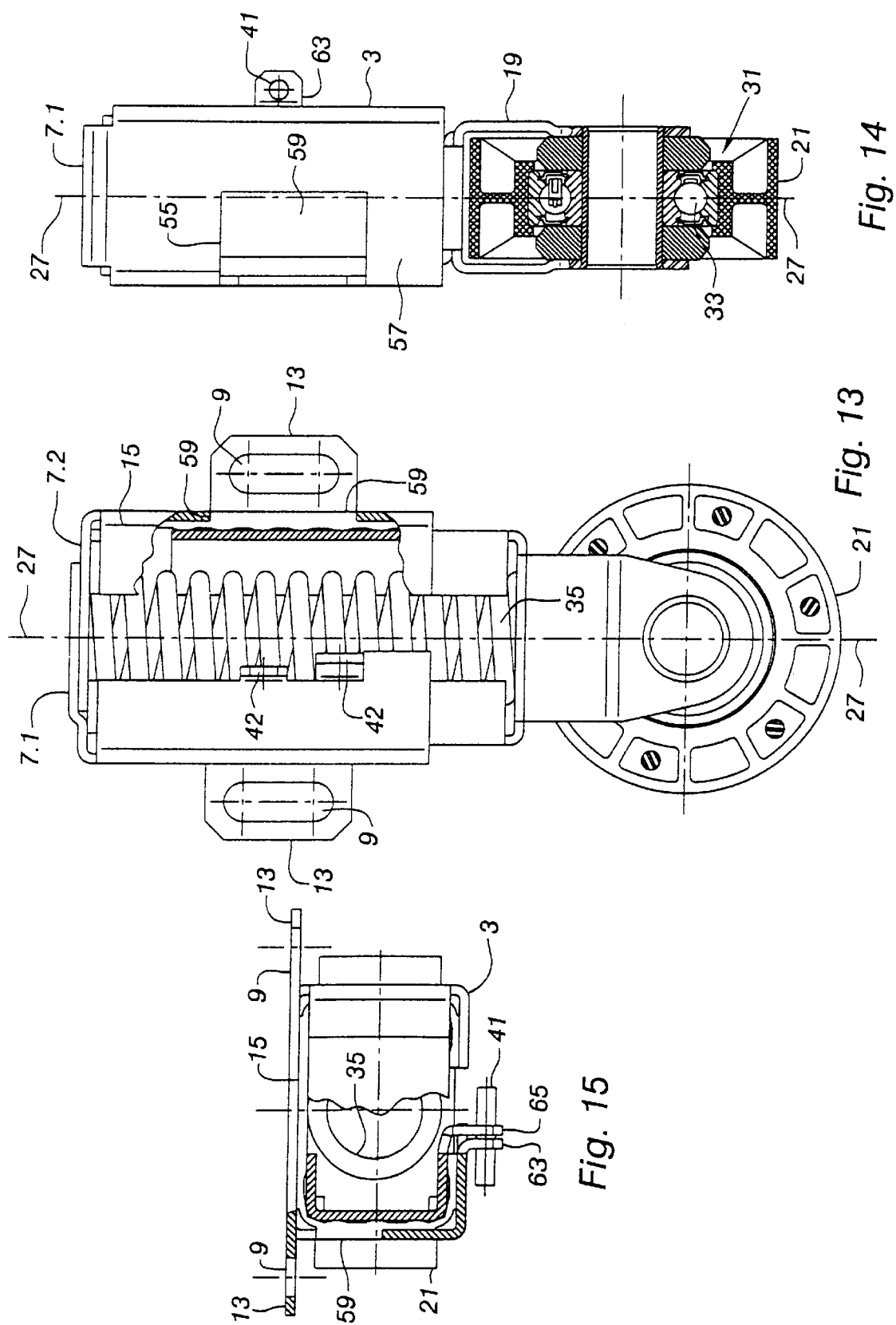

BELT TENSIONER, AND A DRIVE SYSTEM AND ENGINE INCLUDING SUCH A TENSIONER

The present invention relates mainly to a belt tensioner, and to a drive system and to an engine including such a tensioner.

BACKGROUND OF THE INVENTION

It is conventional to place a belt tensioner in a drive system that includes a belt for transmitting motion from a driving pulley to one or more driven pulleys. Such a tensioner generally comprises a device of the piston-and-cylinder type for guiding relative translation between first and second assemblies, the first assembly being secured to a first end of the tensioner and fixed directly or indirectly to the engine block, while the second assembly is secured to a second end of the tensioner and carries a wheel that runs on the belt, the two assemblies being surrounded by a helical return spring urging said assemblies towards a spaced-apart position. Improved tensioners of known types also include hydraulic damping means. Although such tensioners generally give satisfaction, they are relatively expensive. In addition, some embodiments are bulky and/or of limited lifetime. Furthermore, because it has a return spring that is radially on the outside, a conventional type of tensioner has to be fixed via one of its ends. Such fixing is not necessarily the strongest nor the best suited to the small amount of space available in an engine compartment.

OBJECTS AND SUMMARY OF THE INVENTION

Consequently, an object of the present invention is to provide a belt tensioner that is simple in structure.

Another object of the present invention is to provide a tensioner capable of receiving fixing means on any portion of its length.

Another object of the present invention is to provide a belt tensioner that is very reliable and that has a long lifetime.

Another object of the present invention is to provide such a tensioner that is of low cost.

These objects are achieved by a tensioner of the present invention comprising a rigid cage advantageously fitted with fixing means, e.g. for fixing to an engine block or to a plate rotatably mounted on such an engine block.

A rigid part slides in said cage and carries, preferably at one of its ends, means for bearing against a belt, in particular a wheel. Resilient return means urging the cage and the wheel-supporting parts towards a spaced-apart position are mounted inside said part, said means preferably being constituted by a spring, and typically by a helical spring.

Advantageously, the axis of the spring coincides with the longitudinal axis of the rigid cage which itself coincides with the axis of the wheel-carrying part.

Advantageously a layer of self-lubricating material, in particular polytetrafluoroethylene (PTFE), of plastics material, or of elastomer material, is interposed between the cage and the facing face of the wheel-carrying part so as to decrease, increase, or control friction during the sliding of said part in the cage, so as to provide guidance, and friction that serves to damp the tensioner.

The present invention mainly provides a tensioner for a belt, the tensioner comprising:

bearing means for bearing against a drive belt;

an anchor element; and a resilient return element for pressing the bearing means against the drive belt;

wherein the anchor element comprises a rigid cage for guiding in translation support means for supporting the means for bearing against the belt, and wherein the resilient return element is an element internal to said rigid cage.

The present invention also provides a tensioner, wherein the resilient return element comprises a helical spring disposed inside the support means for the means for bearing against the belt.

The present invention also provides a tensioner, wherein the axes of the anchor element, of the resilient return element, and of the support means guided in translation by the anchor element coincide with a longitudinal axis of the tensioner.

The present invention also provides a tensioner, wherein the anchor element has openings or eyelets for passing fixing bolts.

The present invention also provides a tensioner, wherein the cage is made of sheet metal, and wherein the openings for passing bolts are formed in tabs made by splaying out the sheet metal of the cage by means of is cutouts made in the side walls of the cage.

The present invention also provides a tensioner, including a layer interposed between the rigid cage and the support means so as to provide both guidance and friction to damp the tensioner.

The present invention also provides a tensioner, wherein the intermediate layer is made of elastomer.

The present invention also provides a tensioner, wherein the rigid cage and the support means are substantially rectangular in section.

The present invention also provides a tensioner, wherein the means for bearing against the belt include a wheel.

The present invention also provides a tensioner, including locking means for locking it in a compact storage and mounting condition in which the resilient return element is compressed.

The present invention also provides a tensioner, wherein the locking means comprise a first projecting element secured to the cage, a second projecting element secured to the support means, and a removable coupling part for coupling said projecting elements together.

The present invention also provides a tensioner, wherein the projecting elements include pieces of sheet metal folded from the cage and from the support means, and wherein the coupling part is a pin passing through holes formed in said projecting elements.

The present invention also provides a tensioner, including stroke-limiting means for limiting the stroke of the support means for the means bearing against the belt so as to prevent them from leaving the cage.

The present invention also provides a tensioner, wherein the stroke-limiting means include a sheet metal extension of the cage placed on the path of a projecting sheet metal element of the support means for the means for bearing against the belt.

BRIEF DESCRIPTION OF THE DRAWINGS

The invention will be better understood from the following description and the accompanying figures, in which:

FIG. 1 is a front view of the first embodiment of a tensioner of the present invention in a compact condition for storage and mounting, the return spring thereof being omitted from the figure;

FIG. 2 is a partially cut-away side view of the FIG. 1 tensioner in a compact condition for storage and mounting;

FIG. 3 is a front view of the FIG. 1 tensioner in a prestressed condition;

FIG. 4 is a plan view of the FIG. 1 tensioner in a compact condition for storage and mounting;

FIG. 5 is a front view of a second embodiment of the tensioner of the present invention in a compact condition for storage and mounting;

FIG. 6 is a partially cut-away side view of the FIG. 5 tensioner in a compact condition for storage and mounting;

FIG. 7 is a front view of the FIG. 5 tensioner in a prestressed condition;

FIG. 8 is a plan view of the FIG. 5 tensioner in a compact condition for storage and mounting;

FIG. 13 is a partially cut-away front view of a preferred embodiment of the tensioner of the present invention in a prestressed condition;

FIG. 14 is a partially cut-away side view of the FIG. 13 tensioner in a compact condition for storage and mounting;

FIG. 15 is a partially cut-away plan view of the FIG. 13 tensioner in a compact condition for storage and mounting.

In FIGS. 1 to 16b, the same references are used to designate the same elements.

MORE DETAILED DESCRIPTION

Figure 9:
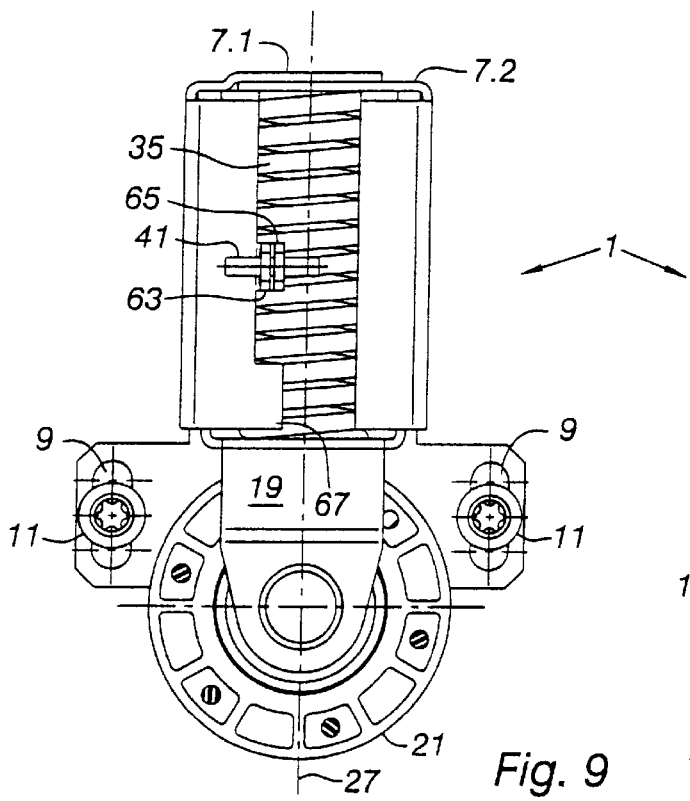
FIG. 9 is a front view of a third embodiment of a tensioner of the present invention in a compact condition for storage and mounting.
Figure 10:
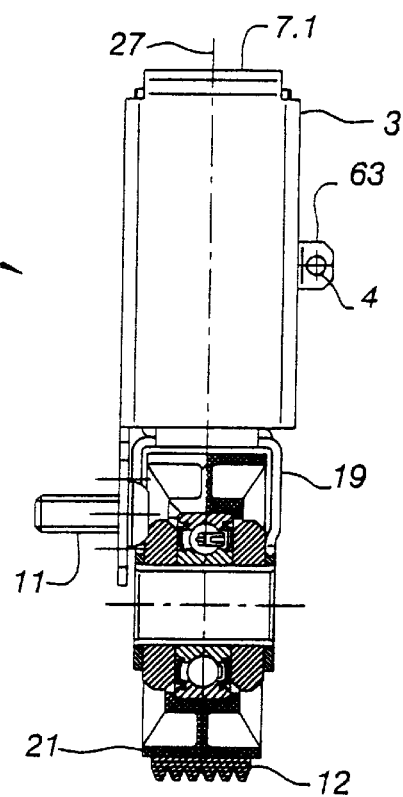
FIG. 10 is a partially cut-away side view of the FIG. 9 tensioner in a compact condition for storage and mounting.

In FIGS. 1 to 4, there can be seen a tensioner 1 comprising a cage 3 which is advantageously prismatic in shape, e.g. constituting a rectangular parallelepiped with rounded edges, and having an opening 5 in its front face.

By way of example, the cage 3 is made of 2 mm thick steel sheet and has a height of 70 mm and a base of 50 mm×35 mm. The top end of the cage is closed by two flaps 7.1 and 7.2 that are folded through 90° and superposed on each other over a portion of their length.

The tensioner of the present invention can be secured to its support, in particular the cylinder block of an internal combustion engine, by any conventional fixing means.

In the preferred embodiment of the invention, the tensioner of the present invention is secured to its support by bolts 11 passing through openings 9 formed in an element that is secured to the cage 3. The openings 9 may be circular. However, it is advantageous to use bolt-receiving openings 9 that are of elongate shape on axes parallel to the axis of the tensioner 1, thereby enabling the tensioner of the present invention to be fixed in various positions, and in particular enabling the tensioner 1 to be moved relative to the fixing bolts in such a manner as to accommodate geometrical dispersion and manufacturing tolerances in the accessories driven by the belt 23, and also manufacturing tolerances in the belt. In addition, a tensioner provided with elongate openings can be fitted without modification to a variety of engine configurations.

In the embodiments shown in FIGS. 1 to 8, the openings 9 are formed through two tabs 13 fixed to the bottom portions of the side walls of the cage 3, e.g. by welding. In the embodiment shown in FIGS. 9 to 12, the openings 9 are formed through an extension 51 of a rear wall 53 of the cage 3.

In the embodiment shown in FIGS. 13 to 15, the openings 9 are formed in tabs 13 implemented by splaying out the metal sheet by means of cutouts 55 formed in the side walls 57 of the cage 3.

In an embodiment that is not shown, the rear wall 53 of the cage 3 can be of greater height than the other faces and can have openings for receiving fixing bolts.

Although fixing by means of two bolts 11 has given full satisfaction, implementing a greater number of openings 9 and in particular a combination of the openings 9 formed in the various embodiments of the tensioner 1 does not go beyond the ambit of the present invention.

The inside wall of the cage 3 is lined with a layer 15 of a material for controlling friction during the sliding of an internal part 17, and in particular for reducing the friction, which part has a clevis 19 carrying a wheel 21 for pressing against a belt 23. The friction between the part 17 and the cage 3 is determined in particular by their contact area and by their coefficient of friction. A coefficient of friction that is low and constant is obtained by using PTFE. An increase in friction gives rise to an increase in damping but to a decrease in the frequency response of the tensioner of the present invention. A large coefficient of friction is obtained, for example, by using a layer 15 of elastomer, in particular of natural rubber type for moderate operating temperatures, nitrile butadiene rubber advantageously filled with a lubricant such as graphite or hydrogenated nitrile butadiene rubber (HNBR) and covered in a film of lubricant such as grease. The elastomer layer 15 advantageously has hardness lying in the range 60 to 90 on the Shore A scale. The layer 15 can have recesses, e.g. formed by patterns in relief defining rectangular cavities for receiving lubricants such as grease. The internal part 17 and/or the cage 3 include an element for holding the layer 15 in place, e.g. studs or a shoulder.

In the embodiment of the present invention that is provided with cutouts 55 (FIGS. 13 to 15), the layer 15 is advantageously provided with local extra thickness 59 placed in register with and penetrating into the cutouts, thereby serving to hold the layer 15 axially in position. The layer 15 can be provided on one or both of its faces with asymmetrical patterns, e.g. a Christmas-tree pattern, adapted to give rise to coefficients of friction that are different depending on the direction of displacement of the internal part 17 relative to the cage 3. Advantageously, friction is low while the spring 35 is expanding and higher while it is being compressed.

It may be advantageous to use a layer 15 of thickness that is slightly greater than the space available between the cage 3 and the part 17. The reaction of the layer 15 to compression forces between the cage 3 and the part 17 increases friction coefficients and reduces or advantageously eliminates the clearance between the cage 3 and the part 17.

In an embodiment, the layer 15 has two [-shaped (bracket-shaped) portions disposed symmetrically about a vertical plane 25 containing the longitudinal axis 27 of the tensioner and perpendicular to the rear face 9 of the cage 3. Advantageously, the layer 15 is made as a single piece and in cross-section is substantially C-shaped. The layer 15 extends from a first edge of the opening 5, overlying a first internal side face of the cage 3, the internal rear wall of the cage 3, a second internal side face of the cage 3, and the front face up to the vicinity of the other edge of the opening 5.

Advantageously, the layer 15 extends over substantially the entire height of the part 17. By way of example, the thickness of the layer 15 can be 2.15 mm.

The present invention is not limited to implementing a layer 15 which is placed freely between the cage 3 and the part 17, but on the contrary it covers implementing a layer 15 bonded to the cage 3, bonded to the part 17, or bonded to both of them, in which case damping is not obtained by friction between the layer 15 and the cage 3 and/or the part 17, but by work performed on the elastomer, specifically work in shear. In a variant, using a layer 15 which is bonded simultaneously to the cage 3 and to the part 17 makes it possible to simplify the tensioner of the present invention in that, under some circumstances, it is then possible to omit implementing additional resilient return means such as a helical spring. Under such circumstances, in order to obtain the desired stroke, it is possible to use a layer 15 having thickness lying in the range 0.5 mm to 5 mm, preferably in the range 0.8 mm to 3 mm, and for example lying in the range 1.5 mm to 2 mm.

The part 17 is of a shape analogous to the shape of the layer 15, preferably a C-shape or, as shown, a [-shape that is symmetrical about the plane 25 and that is terminated in its bottom portion by a section 29 extending parallel to the flaps 7.1 and 7.2 of the cage 3. A clevis 19 is fixed to the section 29 and carries a wheel 21, advantageously via a ball bearing 31. A first end of a helical spring 35 bears against the flaps 7.1 and 7.2 of the cage 3 and the opposite end of the spring 35 bears against the section 29 of the part 17. Thus, when the tensioner 1 of the present invention is fixed, e.g. to an engine block, the spring 35 presses the wheel 21 against the belt 23 so as to exert thereon the tension required to ensure proper operation, e.g. of an internal combustion engine. Advantageously, the longitudinal axes of the cage 3, of the layer 15, of the part 17, and of the spring 35 coincide with the longitudinal axis 27 of the tensioner. Advantageously, the radially outer edges of the spring 35 bear against the inner ends of the [-shape of the part 17 which serves to guide them.

The tensioner of the present invention is advantageously provided with a prestress device that preferably forms means for limiting the stroke of the part 17 so as to prevent it from moving out of the cage 3.

In the example shown in FIGS. 1 to 4, the prestress device comprises an axial rod or strip 39 connecting the clevis 19 to the flaps 7.1 and 7.2 through which it passes, and including a hole 42 for receiving a pin 41. Having the spring compressed by the rod 39 and the pin 41 makes it easier to put the tensioner 1 of the present invention into place and to engage it on the belt 23. Removing the pin 41 releases the spring 35 so as to tension the belt 23. Advantageously, the end of the rod or strip 39 remote from the clevis 19 (the top end in the figures) is provided with stop means for limiting the stroke of the part 17 so as to prevent it from moving out from the cage 3. In the example shown, the stop means 61 are constituted by a zone 61 of the rod or strip that extends at right angles.

To clarify FIG. 1, the spring 35 is not shown in this figure, thereby leaving the rod or strip 39 visible.

The tensioner of the present invention can be provided with means for storing the pin 41 after it has been withdrawn, e.g. on the axis of the bearing 31.

The embodiment of the tensioner of the present invention shown in FIGS. 5 to 8 has a lateral strip placed parallel to the front face of the tensioner.

The strip 39 of FIGS. 5 to 8 also has a hole for receiving the pin 41 in the storage and mounting position together with a folded zone 61 for limiting the stroke of the part 17 relative to the cage 3.

In the embodiments shown in FIGS. 9 to 15, the cage 3 is provided with a projecting element 63 while the part 17 is provided with a projecting element 65 disposed in such a manner that in the storage and mounting position as shown in FIGS. 9, 10, 12, 14, and 15, the projecting elements 63 and 65 are in register, enabling a coupling element to be engaged thereon, thus holding the part 17 inside the cage 3 in the desired position.

In the preferred embodiment of the invention, the projecting elements 63 and 65 correspond to sheet metal elements folded through a right angle relative to the front wall of the cage 3 parallel to each other. Each projecting element 63 and 65 has a hole 42 for receiving a pin 41.

Figure 11:
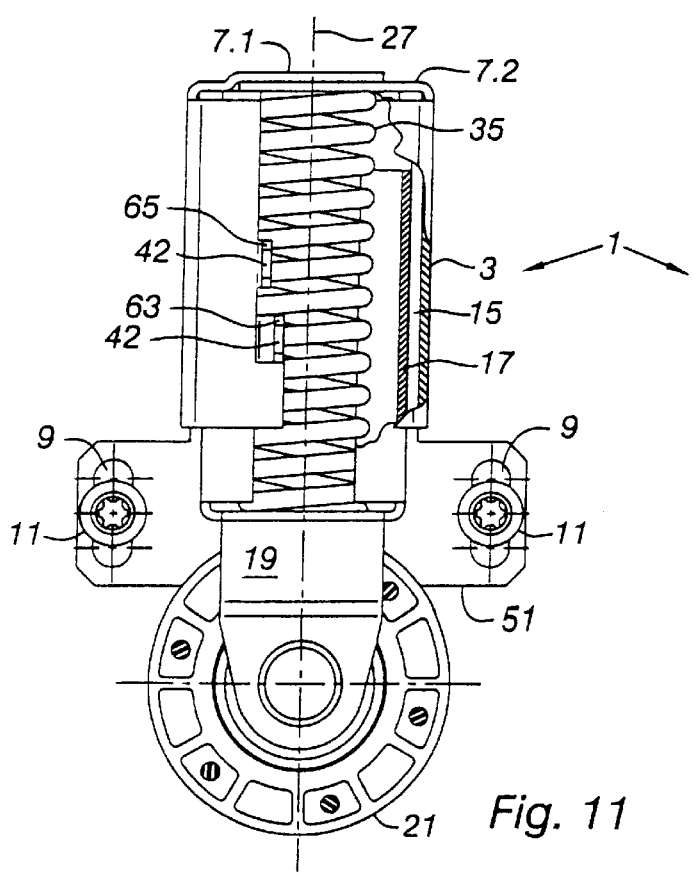
FIG. 11 is a partially cut-away front view of the FIG. 9 tensioner in a prestressed condition.
Figure 12:
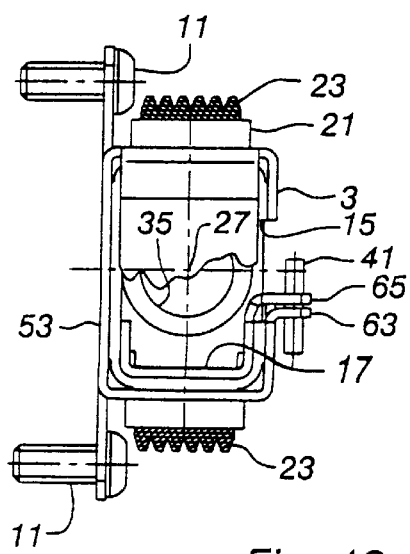
FIG. 12 is a partially cut-away plan view of the FIG. 9 tensioner in a compact condition for storage and mounting.

Advantageously, the front face of the cage 3 has an extension 67 which reduces the width of the opening 5 at its bottom end. The extension 67 is disposed in a plane orthogonal to the projecting element 65 and serves to limit the downward stroke thereof, when the tensioner is in its prestressed condition as shown in FIGS. 11 and 13.

Naturally, implementing other devices for prestressing the tensioner of the present invention, e.g. of the type comprising a threaded rod and a nut or a fork connecting the clevis 19 to an element of the cage 3 would not go beyond the ambit of the present invention.

The tensioner 1 of the invention is of simple structure and is consequently reliable, it is compact, and it is particularly easy to include in the engine compartment of a motor vehicle.

In addition, the preferred embodiments described and shown have no pneumatic or hydraulic means for damping vibration. As a result they can operate in any position and not only in the vertical position with the clevis 19 pointing downwards as shown, but can also operate on a slant, horizontally, or indeed in a vertical position with the clevis 19 pointing upwards.

Naturally the present invention is not limited to the preferred embodiments described. On the contrary, the part 17 and/or the cage 3 can be made by molding, in particular out of light alloy, plastics material, composite material, etc. The helical spring 35 can be replaced by or associated with a spring blade, a layer of elastomer, or hydraulic and/or pneumatic return means.

Similarly, without going beyond the ambit of the present invention it is possible to provide the tensioner of the present invention with a pneumatic or hydraulic damping device of conventional type.

Naturally the present invention is not limited to using a spring 35 that operates in compression, but also extends to a tensioner provided with a spring that operates in traction, having a first end secured to a cage 3 and having a second end remote from the first end secured to the wheel-carrying clevis 19.

The body of the tensioner of the present invention can be of any section, and in particular its section can be in the form of a polygon which may be regular or otherwise, it can be circular, elliptical, or some other section.

The present invention applies in particular to the mechanical engineering industry.

The present invention applies mainly to the motor vehicle industry, with the tensioner of the present invention being suitable for use in the distribution and/or transmission drive system of a vehicle engine.

The invention makes it possible to implement a tensioner in which the fixed support element 3, the moving support element(s) 19 and/or 29, and the wheel 21 lie on a common axis.

The wheel 21 can be mounted directly on the moving part without using an intermediate part.

One or more elements such as the layer 15, e.g. made of elastomer, interposed between the fixed and moving parts serves to provide guidance and friction for damping the tensioner. The layer 15 can have a thickness that is perceptibly greater than the gap available between the cage 3 and the support means 17, 19.

It will be observed that the fixed parts 3, 13 and the moving parts 19, 29 are not necessarily rectangular. By way of example they could be cylindrical or quasi-cylindrical.

The parts can be made of metal sheet, but they can also be made in other ways, e.g. in the form of molded section members.

Figure 16A:
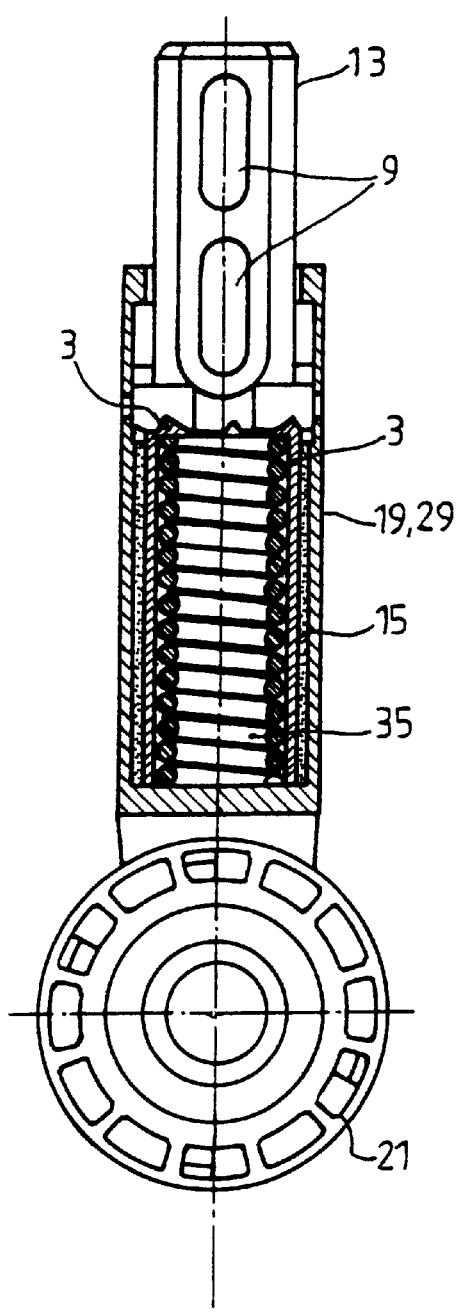
FIGS. 16a and 16b are respectively a front view in section and a partially cut-away side view of another embodiment of the invention.
Figure 16B:
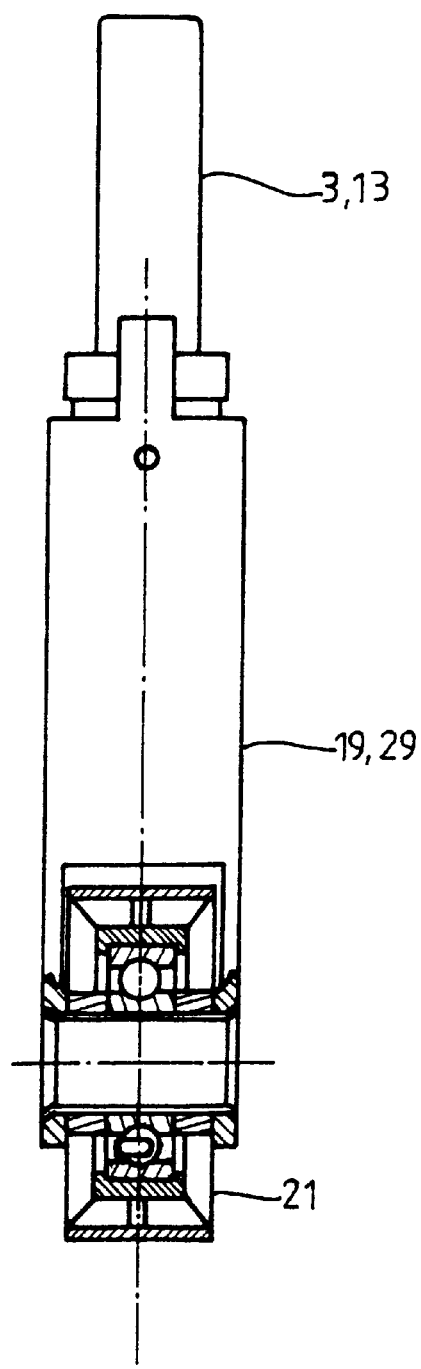

FIGS. 16a and 16b show a variant in which the moving part 19, 29 slides on the outside of the fixed part 3, 13.

What is claimed is:

1. A tensioner for a belt, the tensioner comprising:
    bearing means for bearing against a drive belt;
    an anchor element; and
    a resilient return element for pressing the bearing means against the drive belt;
    wherein the anchor element comprises a rigid cage for guiding in translation support means for supporting the means for bearing against the belt, and wherein the resilient return element is an element internal to said rigid cage, said resilient return element including a layer interposed between the rigid case and the support means, said layer having a thickness larger than a space available between the rigid cage and the support means so as to provide both guidance and friction to damp the tensioner.

2. A tensioner according to claim 1, wherein the resilient return element comprises a helical spring disposed inside the support means for the means for bearing on the belt.

3. A tensioner according to claim 1, wherein an axis of the anchor element, an axis of the resilient return element, and an axis of the support means guided in translation by the anchor element coincide with a longitudinal axis of the tensioner.

4. A tensioner according to claim 1, wherein the anchor element has openings or eyelets for passing fixing bolts.

5. A tensioner according to claim 1, wherein the layer is made of elastomer.

6. A tensioner according to claim 1, wherein the rigid cage and the support means are substantially rectangular in section.

7. A tensioner according to claim 1, wherein the means for bearing against the belt include a wheel.

8. A tensioner according to claim 1, including locking means for locking the tensioner in a compact storage and mounting condition in which the resilient return element is compressed.

9. A tensioner according to claim 1, including stroke-limiting means for limiting the stroke of the support means for the means for bearing against the belt so as to prevent the support means from leaving the cage.

10. A tensioner according to claim 1, wherein the anchor element, the support means, and the bearing means all lie on a common axis.

11. A tensioner according to claim 4, wherein the cage is made of sheet metal, and wherein the openings for passing bolts are formed in tabs made by splaying out the sheet metal of the cage by-means of cutouts made in the side walls of the cage.

12. A tensioner according to claim 8, wherein the locking means comprise a first projecting element secured to the cage, a second projecting element secured to the support means, and a removable coupling part for coupling said projecting elements together.

13. A tensioner according to claim 9, wherein the stroke-limiting means include a sheet metal extension of the cage placed on the path of a projecting sheet metal element of the support means for the means for bearing against the belt.

14. A tensioner according to claim 12, wherein the projecting elements include pieces of sheet metal folded from the cage and from the support means, and wherein the coupling part is a pin passing through holes formed in said projecting elements.

* * * * *